(12) United States Patent
Phillips

(10) Patent No.: US 7,055,780 B2
(45) Date of Patent: Jun. 6, 2006

(54) LIFE SUPPORT SYSTEMS FOR AIRCRAFT

(75) Inventor: Robert John Phillips, Honiton (GB)

(73) Assignee: Honeywell Normalair-Garrett (Holdings) Limited, Yeovil ( * ) Notice: Subject to any disclaimer, the term of this patent is extended or adjusted under 35 U.S.C. 154(b) by 213 days.

(21) Appl. No.: 10/761,863

(22) Filed: Jan. 21, 2004

(65) Prior Publication Data
US 2005/0098683 A1 May 12, 2005

Related U.S. Application Data

(63) Continuation of application No. PCT/GB03/00617, filed on Feb. 13, 2003.

(30) Foreign Application Priority Data
Feb. 15, 2002 (GB) ................................ 0203640.8

(51) Int. Cl.
*B64D 13/02* (2006.01)

(52) U.S. Cl. .............................. 244/118.5; 128/205.11; 128/204.18

(58) Field of Classification Search ............. 244/118.5; 128/200.24, 204.18, 205.11, 205.25, 206.21
See application file for complete search history.

(56) References Cited

U.S. PATENT DOCUMENTS

| 2,934,293 | A | * | 4/1960 | Boehme et al. | .......... 244/118.5 |
| 4,651,728 | A | | 3/1987 | Gupta et al. | .......... 128/201.28 |
| 5,809,999 | A | * | 9/1998 | Lang | ..................... 128/200.24 |
| 6,244,540 | B1 | * | 6/2001 | Stabile et al. | ............. 244/118.5 |

FOREIGN PATENT DOCUMENTS

| EP | 0827907 | 3/1998 |
| WO | WO 02/04076 | 1/2002 |

\* cited by examiner

*Primary Examiner*—Robert P. Swiatek
(74) *Attorney, Agent, or Firm*—MacMillan, Sobanski & Todd, LLC

(57) ABSTRACT

A life-support system for an aircraft B includes a first oxygen supply apparatus A operable to provide a limited supply of first product gas being one of pure oxygen and oxygen enriched gas, to a breathing gas supply apparatus 12, 13, 14, and a second oxygen supply apparatus B operable to supply a durable supply of second product gas which is an oxygen enriched gas containing a lower concentration of oxygen than that in the first product gas, to the breathing gas supply apparatus 12, 13, 14, wherein the second product gas is supplied as the pressure which is higher than that at which the first product gas is supplied to the breathing gas supply apparatus 12, 13, 14.

9 Claims, 2 Drawing Sheets

LIFE SUPPORT SYSTEMS FOR AIRCRAFT

DESCRIPTION OF INVENTION

This invention relates a life support system for an aircraft, and to a method of operating the life support system.

Aircraft operating at high altitudes where the surrounding atmosphere does not provide a sufficient partial pressure of oxygen to maintain life have to be provided with means for furnishing air crew and any passengers with a breathable gas which is life-sustaining. In commercial aircraft this is achieved by providing a crew or passenger cabin which is pressurised, so that it is not necessary to provide a local oxygen supply to each passenger and crew member e.g. via a breathing mask. An emergency oxygen supply is made available for use if there should be a demand or an increased demand for oxygen or oxygen enriched gas, for example in the event that the cabin becomes de-pressurised.

Such emergency oxygen supply has hitherto been provided from compressed gas storage containers and/or by chemical reaction, and is supplied to passengers and crew by individual breathing masks. The emergency oxygen supply is able to be maintained for sufficient time to enable the pilot to bring the aircraft down to a holding altitude at which the crew and passengers can again breathe atmospheric gases.

It has been proposed, for example in our published international patent application WO 02/04076, that oxygen or oxygen enriched gas for an aircraft emergency oxygen supply may be derived from an onboard oxygen generating system which is capable of supplying oxygen enriched gas indefinitely. The oxygen supply apparatus is preferably of the molecular sieve bed type which works by adsorbing non-oxygen gas from a pressurised gas supply, for example air bled from an engine compressor, fed to a bed of material such as zeolite. The gas emerging from the bed is oxygen-enriched, possibly up to 95% oxygen under appropriate operating conditions. Two or more molecular sieve beds have to be utilised for indefinite maintenance of a supply of oxygen-enriched gas: while one or more beds are operating to oxygen-enrich the gas being passed therethrough, the other bed(s) is purged of the non-oxygen gas by being opened to low pressure atmosphere. By such alternate use of the beds, a continuous supply of the oxygen-enriched gas can be maintained.

Generally the construction and operation of molecular sieve bed type oxygen supply apparatus or generators, known as MSOGS, is well known and a detailed description of such MSOGS is not considered necessary for the understanding of the present invention. However there are other types of indefinitely-operable oxygen enriched gas supply apparatus, for example of the gas-permeable membrane type or the ceramic type.

International application WO 02/04076 also describes how main and auxiliary oxygen supply apparatus of the molecular sieve bed type may be used to supply product gas, which may be pure oxygen or oxygen enriched gas, to a breathing gas supply apparatus in such a way that in the event of an emergency, e.g. a cabin decompression, product gas is available for breathing at the earliest opportunity, enabling the pilot of the aircraft safely to reduce height to one at which the aircraft may continue to be flown while its occupants continue to breath the product gas.

A small supply of oxygen e.g. in pressurised containers may still be necessary to provide breathing gas immediately on decompression until the MSOGS oxygen supply apparatus is brought on line. In any event, once the MSOGS apparatus has been brought on line the aircraft may continue to be flown at a holding altitude possibly of about 20,000 ft while the passengers are supplied with breathing gas from the MSOGS oxygen supply apparatus, which altitude is much higher than the altitude to which the aircraft would have to descend if there were no oxygen supply apparatus capable of operating indefinitely.

However it remains the case that most commercial aircraft have an emergency oxygen supply which is intended to operate from a stored supply of compressed pure or substantially pure oxygen, to be delivered only for the time necessary for the aircraft to descend to a relatively low safe holding altitude.

It would be desirable if one could provide an indefinitely-operable oxygen generation system, for example a MSOGS, and simply connect this to a conventional emergency oxygen supply system without requiring any substantial modifications to the existing emergency oxygen system to modify the aircraft to enable the aircraft to be flown at higher holding altitudes in emergency conditions.

However this would entail the additional provision of a MSOGS of high capacity to deliver enough oxygen enriched gas at an oxygen concentration comparable with that provided from compressed storage containers. Such large capacity MSOGS would be heavy and bulky which is undesirable for an aircraft. Although a MSOGS is capable of supplying oxygen-enriched gas at an oxygen concentration up to about 95% oxygen, a very large MSOGS would be necessary to achieve this for the quantity of breathing gas demanded by an aircraft carrying a large number of passengers as well as its crew or else a plurality of smaller capacity MSOGS, which together again would be undesirably heavy and bulky or else a plurality of smaller capacity MSOGS may be provided which together again would be undesirably heavy and bulky.

According to one aspect of the present invention, we provide a life support system for an aircraft, including a first oxygen supply apparatus operable to provide a limited supply of first product gas, being one of pure oxygen and oxygen-enriched gas, to a breathing gas supply apparatus, and a second oxygen supply apparatus operable to provide a durable supply of second product gas which is an oxygen-enriched gas containing a lower concentration of oxygen than that in the first product gas, to the breathing gas supply apparatus, wherein the second product gas is supplied at a pressure which is higher than that at which the first product gas is supplied to the breathing gas supply apparatus.

The first oxygen supply apparatus preferably includes one or more pressurised containers storing the first product gas, or provides the first product gas by allowing chemical reagents to react, whilst the second oxygen supply apparatus preferably includes an oxygen supply apparatus of the molecular sieve type.

The present invention is based on the concept that the performance of an MSOGS may be optimised, in relation to its weight, bulk and so on, if it is operated in such a way as to provide oxygen-enriched product gas at less than the maximum degree of oxygen enrichment of which it is capable. By providing such a product gas with a lesser concentration of oxygen to a breathing gas supply apparatus at a higher pressure than would be used for the supply of a more highly-enriched product gas, the effectiveness in terms of keeping the aircraft occupants supplied with adequate breathing gas can be maintained. In other words, the supply of the second product gas to the breathing gas supply apparatus at a lower oxygen concentration but higher pressure enables a smaller and lighter MSOGS to be used.

The breathing gas supply apparatus usually includes one or more breathing gas supply lines leading to individual breathing masks. Each breathing mask may be connected to a supply line by way of an orifice, which effectively controls the oxygen mass fraction reaching the mask. If pressure in the supply line is increased, flow to the mask through the orifice increases so that the same or substantially the same oxygen mass fraction can be achieved at the mask as when the gas in the supply line is at a lower pressure but higher oxygen concentration.

Thus the invention enables a conventional emergency oxygen supply in a commercial aircraft to be adapted to be provided with a durable and indefinite supply of oxygen-enriched gas to enable the aircraft to be flown, in the event of cabin de-pressurisation at higher holding altitudes. To perform the invention, the second oxygen supply apparatus, preferably a MSOGS, is connected to the breathing gas supply line(s) leading to the breathing masks, whilst ensuring that the second oxygen supply apparatus, provides the second product gas at a higher pressure than that at which the breathing gas supply line(s) is supplied with first product gas from the first oxygen supply apparatus (namely the pressurised containers of oxygen or possibly the chemical reaction oxygen generator(s) apparatus).

The invention also provides a method of operating a life support system for an aircraft, including operating a first oxygen supply apparatus to provide a limited supply of a first product gas, which is one of pure oxygen and oxygen enriched gas, to a breathing gas supply apparatus, and operating a second oxygen supply apparatus to provide a durable supply of second product gas which is an oxygen enriched gas containing a lower concentration of oxygen than that of that in the first product gas, to the breathing gas supply apparatus, wherein the second oxygen supply apparatus is operated to supply the second product gas at a pressure higher than that at which the first product gas is supplied to the breathing gas supply apparatus.

Preferably, in the event of an emergency requirement for operation of the life support system, the first oxygen supply apparatus immediately operates and subsequently the second oxygen supply apparatus is operated and continues to be operated even when the first product gas supply has expired.

According to a third aspect of the invention we provide an aircraft having installed therein a life-support system according to the first aspect of the invention.

Examples of the invention will now be described with reference to the accompanying drawings in which.

Figure 1:
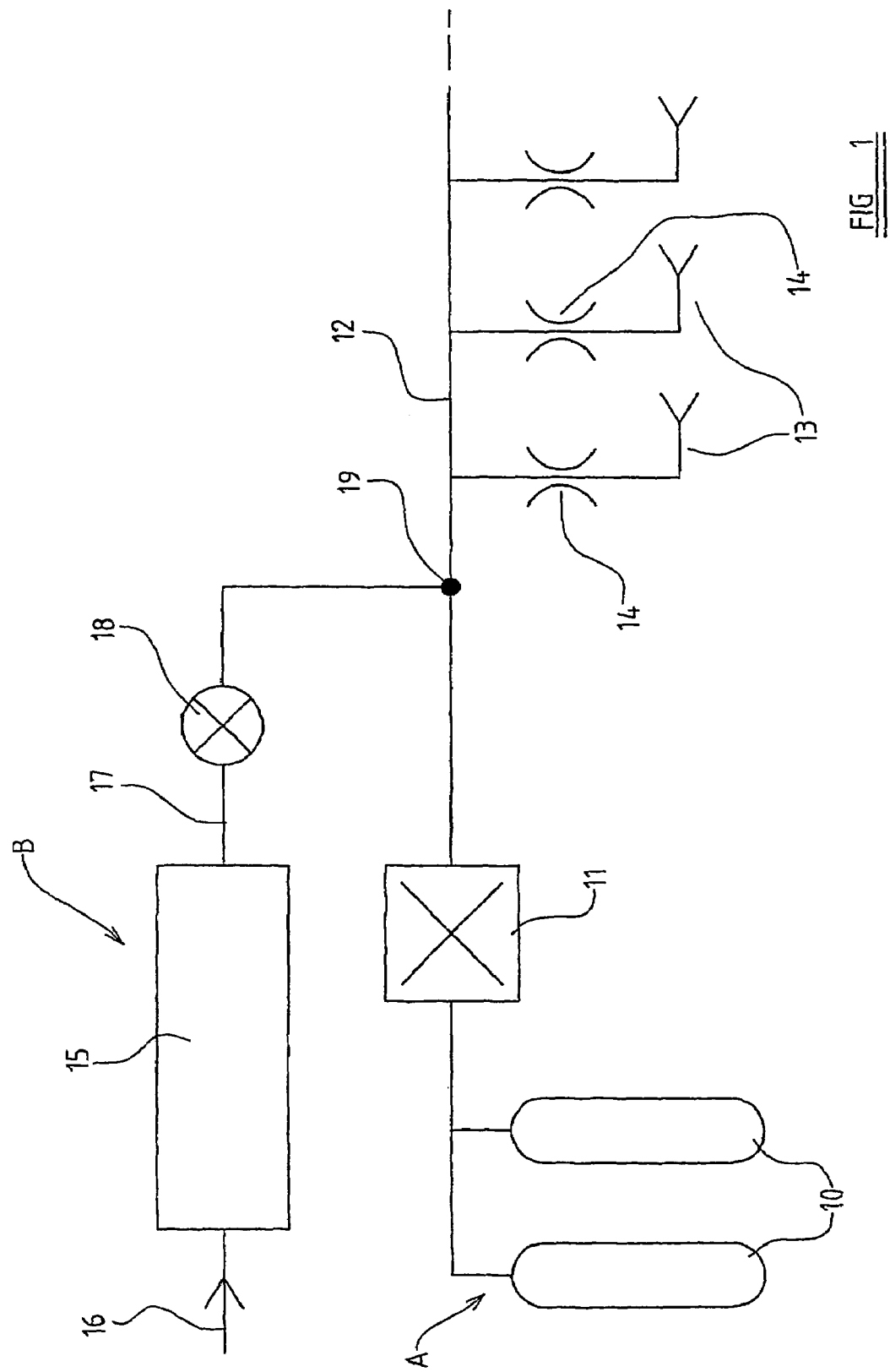
FIG. 1 shows diagramatically a gas supply apparatus in accordance with the invention.

Referring to FIG. 1, a first oxygen supply apparatus A includes one or more pressurised storage containers 10 for a first product gas which may be pure oxygen or nearly pure oxygen. This first oxygen supply apparatus A delivers the first product gas by way of a flow control valve 11, to one or more breathing gas supply lines one of which is indicated at 12. A plurality of breathing masks 13 are fed from the or each supply line 12, by way of respective orifices 14 which control the flow rate to the masks 13 in such a way that when they are used, a suitable life-sustaining oxygen concentration is maintained at the masks 13. The sizes of the orifices 14 are selected so that a required oxygen concentration is maintained at the masks 13, which is consistent with the pressure which is maintained in the line 12.

The masks 13 are deployed and oxygen supplied thereto in the event of sudden loss of aircraft cabin pressure. Usually the amount of oxygen stored in the container or containers 10, is sufficient to maintain a supply to the masks 13 for the length of time it takes the pilot of the aircraft to bring the aircraft down to a holding altitude at which the passengers and crew can continue to breath the ambient atmosphere, until the pilot can land the aircraft. Thus the supply provided from the container or containers 10 is limited and previously the supply has been limited to that which would be required to enable a pilot to descend from a cruising altitude to a holding altitude typically below 10,000 ft.

Figure 2:
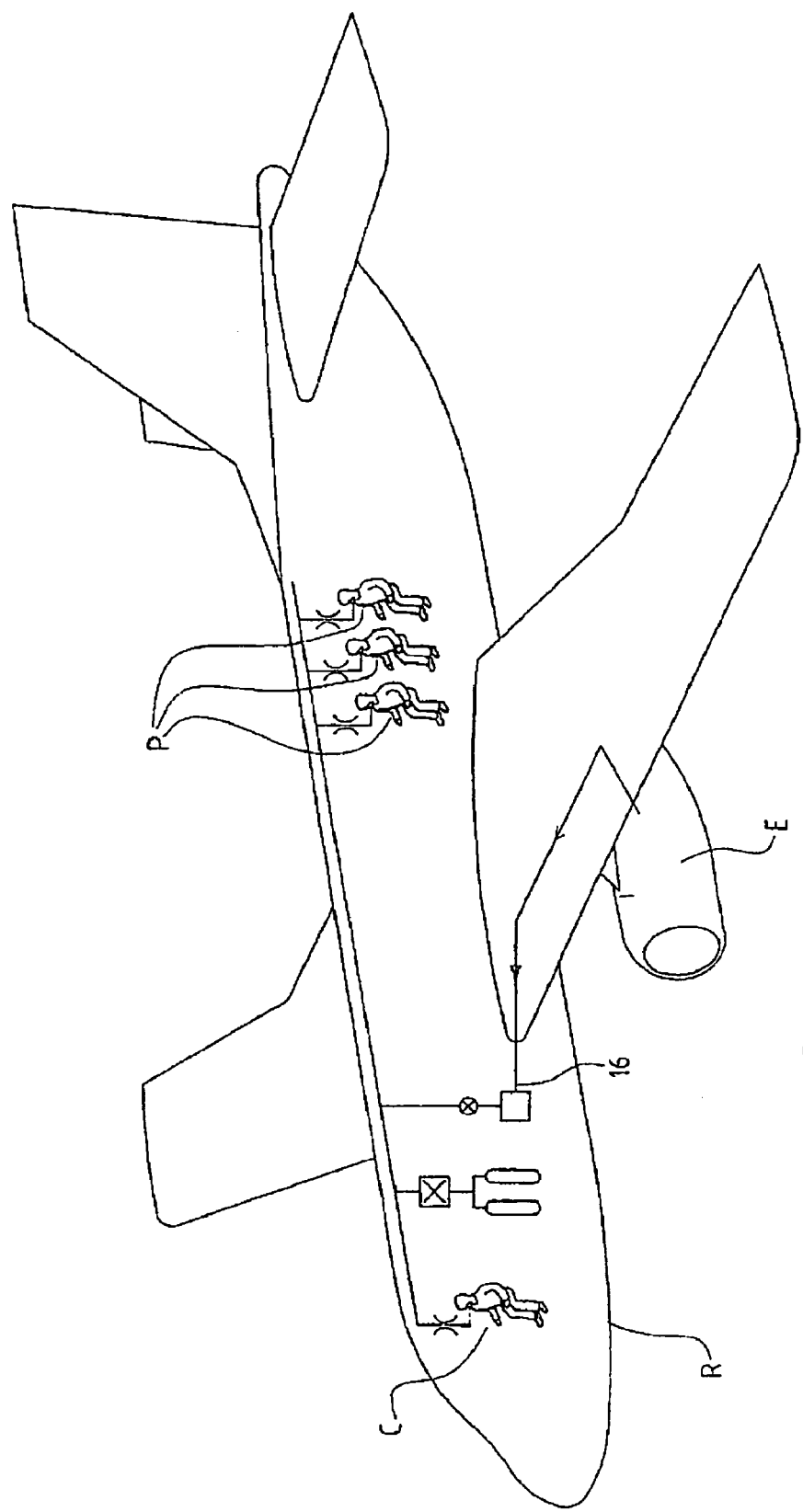
FIG. 2 shows illustratively, an aircraft in which the apparatus of FIG. 1 is installed.

In accordance with the invention, a second oxygen supply apparatus B is provided which preferably is a molecular sieve oxygen generating system 15 (MSOGS) fed with compressed gas (air) at 16 from a compressor of an engine (see E in FIG. 2). Whilst theoretically a MSOGS 15 is capable of providing at its outlet 17 an oxygen—enriched gas of up to about 95% oxygen, a MSOGS of reasonable size and weight for fitting in a commercial aircraft may be arranged and operated in such a way as to deliver a product gas which has a concentration of around 80% oxygen. By way of a valve 18, this second product gas is delivered to the line 12 at a "T"—piece 19 and this gas is delivered at a pressure which is higher than that at which gas is supplied to the line 12 from the container or containers 10 of the first oxygen supply apparatus A. The valve 18 may be a simple "on" and "off" valve controlled by a controller, which is opened when the second oxygen supply apparatus B is to be brought on stream, e.g. after an initial warm-up period.

Under these conditions, a higher flow rate of gas is delivered to the masks 13 through the orifices 14, the result being that although the gas in the supply line 12 contains a lower concentration of oxygen than that first product gas is delivered to the masks 13 the first oxygen supply apparatus A, the effective delivery of oxygen to the masks 13 can be the same or more or less the same as the first product gas when the first product gas is delivered to the masks 13.

Since the MSOGS 15 is capable of providing a durable supply of oxygen-enriched product gas, the masks 13 can be continued to be used indefinitely by the aircraft's occupants with the result that the aircraft can continue to fly at holding altitudes substantially higher than that at which the aircraft would have to fly if use of the masks 13 had to be discontinued when the supply of oxygen from the first oxygen supply apparatus A has run out. At the same time, the selection of a size and weight of one or more MSOGS 15, the or each of which can be operated to supply product gas at an oxygen concentration of e.g. 80%, i.e. less than its theoretical maximum product gas oxygen concentration, means that optimisation of the size of the MSOGS can be achieved.

Referring to FIG. 2 the gas supply apparatus of FIG. 1 is shown illustratively, installed in an aircraft R, and delivering breathing gas to passengers P and crew C, via masks 13.

In practice to prevent the higher pressure second product gas passing back through the flow control valve 11 to the containers 10, a non-return valve may be required, but in any event this may be conventionally provided in which case modification of an existing gas supply system to accommodate this would not be required. Alternatively or additionally, the flow control valve may be switchable to an "off" state to isolate the containers 10 when the second oxygen supply apparatus B is operating.

Of course, although the invention may be employed by adapting an existing gas supply system, the invention may be employed upon installation of a new air breathing system in an old or new aircraft.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed:

1. A life support system for an aircraft, including a first oxygen supply apparatus operable to provide a limited supply of first product gas, being one of pure oxygen and oxygen-enriched gas, to a breathing gas supply apparatus, and a second oxygen supply apparatus operable to provide a durable supply of second product gas which is an oxygen-enriched gas containing a lower concentration of oxygen than that in the first product gas to the breathing gas supply apparatus, wherein the second product gas is supplied at a pressure which is higher than that at which the first product gas is supplied to the breathing gas supply apparatus.

2. A life support system according to claim 1 wherein the first oxygen supply apparatus includes one or more pressurised containers storing the first product gas.

3. A life support system according to claim 1 wherein the first oxygen supply apparatus provides the first product gas by allowing chemical reagents to react.

4. A life support system according to claim 1 wherein the second oxygen supply apparatus is of the molecular sieve type.

5. A life support system according to claim 1, wherein the breathing gas supply apparatus includes at least one breathing gas supply line leading to at least one breathing mask by way of a respective orifice.

6. A method of operating a life support system for an aircraft, including operating a first oxygen supply apparatus to provide a limited supply of a first product gas, which is one of pure oxygen and oxygen enriched gas, to a breathing gas supply apparatus, and operating a second oxygen supply apparatus to provide a durable supply of a second product gas which is an oxygen enriched gas containing a lower concentration of oxygen than that of that in the first product gas to the breathing gas supply apparatus, wherein the second oxygen supply apparatus is operated to supply the second product gas at a pressure higher than that at which the first product gas is supplied to the breathing gas supply apparatus.

7. A method according to claim 6 wherein, in the event of an emergency requirement for operation of the life support system, the first oxygen supply apparatus operates first and subsequently the second oxygen supply apparatus is operated.

8. A method according to claim 6 wherein the second oxygen supply apparatus continues to operate when the first product gas supply has expired.

9. An aircraft having installed therein a life-support system which includes a first oxygen supply apparatus operable to provide a limited supply of first product gas, being one of pure oxygen and oxygen-enriched gas, to a breathing gas supply apparatus, and a second oxygen supply apparatus operable to provide a durable supply of second product gas which is an oxygen-enriched gas containing a lower concentration of oxygen than that in the first product gas to the breathing gas supply apparatus, wherein the second product gas is supplied at a pressure which is higher than that at which the first product gas is supplied to the breathing gas supply apparatus.

* * * * *